(12) United States Patent
Voss et al.

(10) Patent No.: US 7,758,332 B2
(45) Date of Patent: Jul. 20, 2010

(54) AXIS CONTROL IN TORIC CONTACT LENS PRODUCTION

(75) Inventors: Leslie A. Voss, Jacksonville, FL (US); Edward R. Kernick, Jacksonville, FL (US); James R. White, Jacksonville Beach, FL (US); Stephen C. Pegram, Fruit Cove, FL (US); Donnie J. Duis, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 402 days.

(21) Appl. No.: 11/668,036

(22) Filed: Jan. 29, 2007

(65) Prior Publication Data

US 2007/0176310 A1 Aug. 2, 2007

(51) Int. Cl.
*A01J 21/00* (2006.01)
*B29D 11/00* (2006.01)
(52) U.S. Cl. .................. 425/452; 425/808; 264/1.32
(58) Field of Classification Search ............. 425/410, 425/412, 413, 808, 452; 264/1.32, 2.5
See application file for complete search history.

(56) References Cited

U.S. PATENT DOCUMENTS

| | | | |
|---|---|---|---|
| 4,640,489 A | 2/1987 | Larsen | |
| 5,252,056 A | 10/1993 | Horner et al. | |
| 5,611,970 A | 3/1997 | Apollonio et al. | |
| 5,916,494 A * | 6/1999 | Widman et al. | 264/1.1 |
| 5,935,492 A | 8/1999 | Martin | |
| 5,965,172 A | 10/1999 | Wang | |
| 6,197,227 B1 | 3/2001 | Appleton et al. | |
| 6,383,419 B1 | 5/2002 | Dean | |
| 6,471,891 B1 | 10/2002 | Cameron | |
| 6,511,311 B1 * | 1/2003 | Popps | 425/451.9 |
| 6,939,118 B2 | 9/2005 | Chou et al. | |
| 2003/0041449 A1 * | 3/2003 | Parnell et al. | 29/791 |

OTHER PUBLICATIONS

PCT International Search Report, dated Jun. 27, 2007, for PCT Int'l. Appln. No. PCT/US2007/061210.

* cited by examiner

*Primary Examiner*—Christina Johnson
*Assistant Examiner*—Elizabeth Royston

(57) ABSTRACT

The invention provides methods of manufacturing toric lenses, apparatuses useful in the method of the invention, and lenses produced according to the method in which method the position of one mold half in relation to its complementary mold half is more precisely controlled so that tilting and rotation of the mold halves in relation to each other is substantially eliminated.

12 Claims, 6 Drawing Sheets

AXIS CONTROL IN TORIC CONTACT LENS PRODUCTION

FIELD OF THE INVENTION

The invention relates to methods and apparatuses useful in the manufacture of contact lenses. In particular, the methods and apparatuses of the invention provide for the production of toric lenses of differing cylinder correction with improved precision.

BACKGROUND OF THE INVENTION

Toric contact lenses are known for use in correcting the lens wearer's corneal or lenticular astigmatism. Typically, one surface of the lens, the non-toric surface, is spherical and the second lens surface, the toric surface incorporates cylinder power along an axis of between 0° and 180° in increments of about 5° or 10°. The lens' cylinder power must remain substantially aligned with the wearer's axis of astigmatism while the lens is on eye to provide good visual acuity. Thus, a toric lens requires a stabilization feature, such as prism ballast, thick and thin zones, or the like on one of the lens' surfaces to maintain lens alignment on-eye.

In conventional toric contact lens manufacturing processes, one of the mold halves forming the mold is angularly rotated in relation to the other mold half so that the desired toric axis orientation to stabilization features is obtained when the lens material is cured within the mold. However, this method is disadvantageous in that one mold half is relatively unsecured and is free to shift away from the desired position. Additionally, in processes in which one mold half is rotated, typically this same mold half is used to produce a family of stock-keeping units ("SKUs") of lenses. Thus, the mold half cannot be optimized for any one of the SKUs, but must be adjusted to achieve best performance throughout the range of SKUs produced using the mold half.

DETAILED DESCRIPTION OF THE INVENTION AND PREFERRED EMBODIMENTS

The invention provides methods of manufacturing toric lenses, apparatuses useful in the method of the invention, and lenses produced according to the method in which method the position of one mold half in relation to its complementary mold half is more precisely controlled so that tilting and rotation of the mold halves in relation to each other is substantially eliminated. Not only does the improved precision decrease the number of out-of-specification lenses produced, but also provides lenses with better optics as a result of improved toric axis control. Additionally, by controlling the amount of tilt, or non-parallel movement of the mold halves in relation to each other, the number of lenses in which there is a misalignment of the sphere and cylinder powers is decreased. Finally, the method and apparatuses of the invention permit use of front and back mold halves which can be adjusted for individual lens performance during the mold halves' manufacture.

In one embodiment, the invention provides a method for manufacturing toric contact lenses comprising, consisting essentially of, and consisting of the step of holding each of a first and second mold half in controlled alignment in relation to each other. In another embodiment, the invention provides apparatuses for maintaining each of a first and second mold half in a controlled alignment with respect to each other. In yet another embodiment, a mold assembly is provided comprising, consisting essentially of, and consisting of an apparatus for maintaining a controlled alignment of each of a first and second mold half in relation to each other.

In the method of the invention, the alignment of each of the front and back curve old halves is controlled so that tilt and rotation of the mold halves in relation to each other is substantially eliminated. The method of the invention contrasts to known methods in which the position of only one of the mold halves is fixed. Controlling of both of the mold halves may be accomplished by any fixation method. However, preferably, it is accomplished using the apparatuses described herein.

Figure 1A:
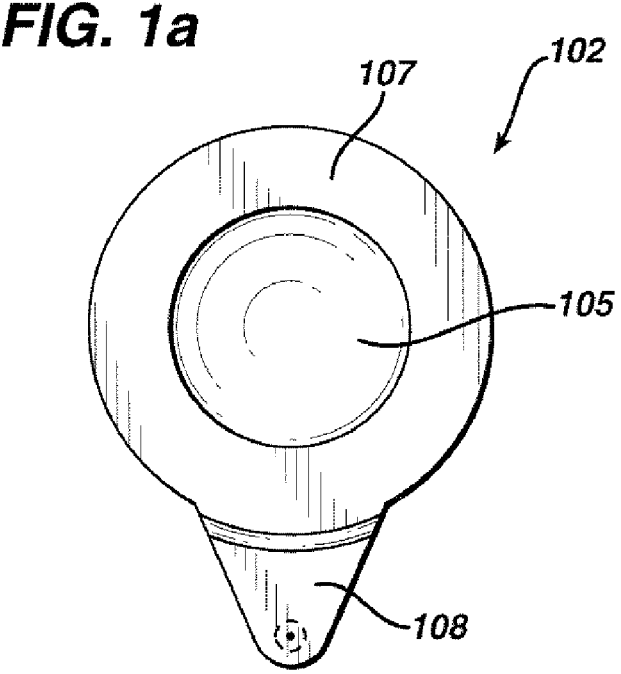
FIG. 1a is a top plan view of a front curve mold half useful in the apparatuses of the invention.
Figure 1B:
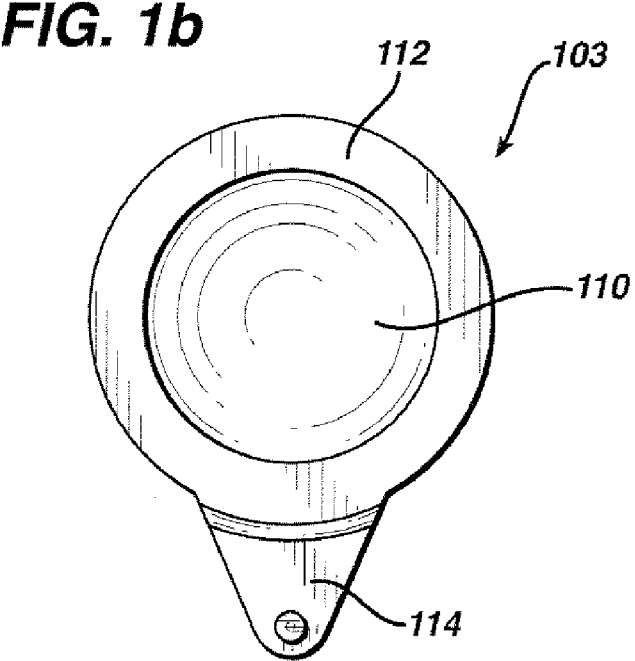
FIG. 1b is a top plan view of a back curve mold half useful in the apparatuses of the invention
Figure 2:
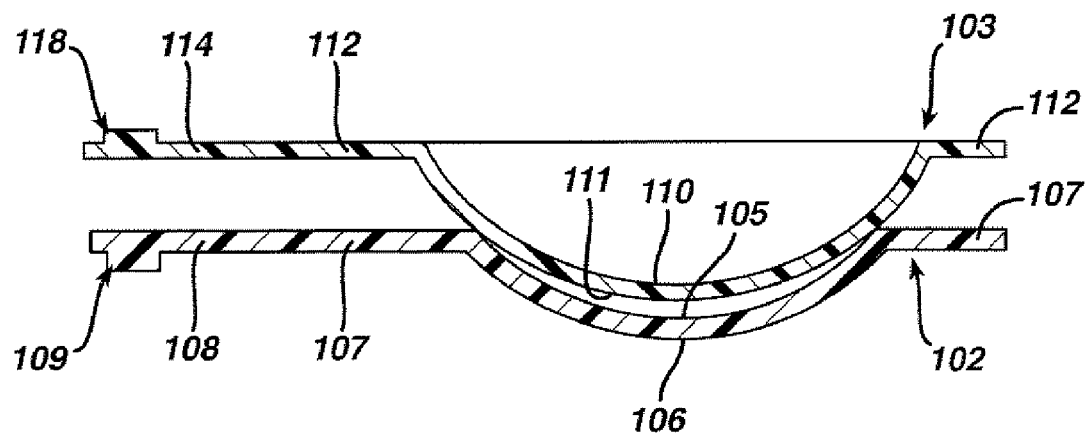
FIG. 2 is a cross-section of a contact lens mold formed using the mold halves of FIGS. 1a and 1b.

FIGS. 1a and 1b depict a top plan view of a front and back curve mold half, respectively, useful in the apparatuses of the invention. It is one discovery of the invention that maintain controlled alignment is facilitated by using a triangular-shaped projecting tab on both the front and back curve mold halves. In FIG. 2 is shown a cross-sectional view of a mold suitable for use manufacturing toric contact lenses, which mold is formed by the mold halves shown in FIGS. 1a and 1b. Referring to FIGS. 1a, 1b and 2, front curve mold half 102 and back curve mold half 103 are shown. Preferably, the mold halves are formed of a material that is transparent to visible and ultraviolet light and suitable for use in toric contact lens manufacturing processes. Typical materials useful in such molds include, without limitation, polystyrene, polypropylene and the like. A central curved section of the front curve mold half 102 defines a concave surface 105, which surface has the dimensions of the unswelled front surface curve of the lens to be cast and is sufficiently smooth so that the lens surface formed is of optically acceptable quality. Surface 105 is spaced generally parallel and apart from concave surface 106 and an essentially uniplanar annular flange 107 integral with and extends radially outwardly from the surfaces 105 and 106 in a plane normal, or perpendicular, to the axis of symmetry of the concave surface 106.

Similarly, back curve mold half 103 has spaced apart surfaces 111 and 110 and an essentially uniplanar annular flange 112 is integral with and extends radially outwardly from the surfaces 110 and 111 in a plane normal, or perpendicular, to the axis of symmetry of the concave surface 110. Back mold half 103 defines a central curved section with an optical quality convex surface 111 and a generally parallel concave surface 110. Convex surface 111 has the dimensions of the unswelled back surface curve of the lens to be cast and is sufficiently smooth so that the lens surface formed is of optically acceptable quality. Convex surface 110 of back mold half 103 and convex surface 106 of front curve mold half 102 need not have surfaces suitable to form optical quality surfaces. Both front and back curve mold halves have projecting tabs 108 and 114, respectively, projecting radially beyond flanges 107 and 112. The mold halves optionally may include tabs 118 extending radially upwardly and 109 extending radially downwardly from tabs 108 and 114, respectively.

Figure 3:
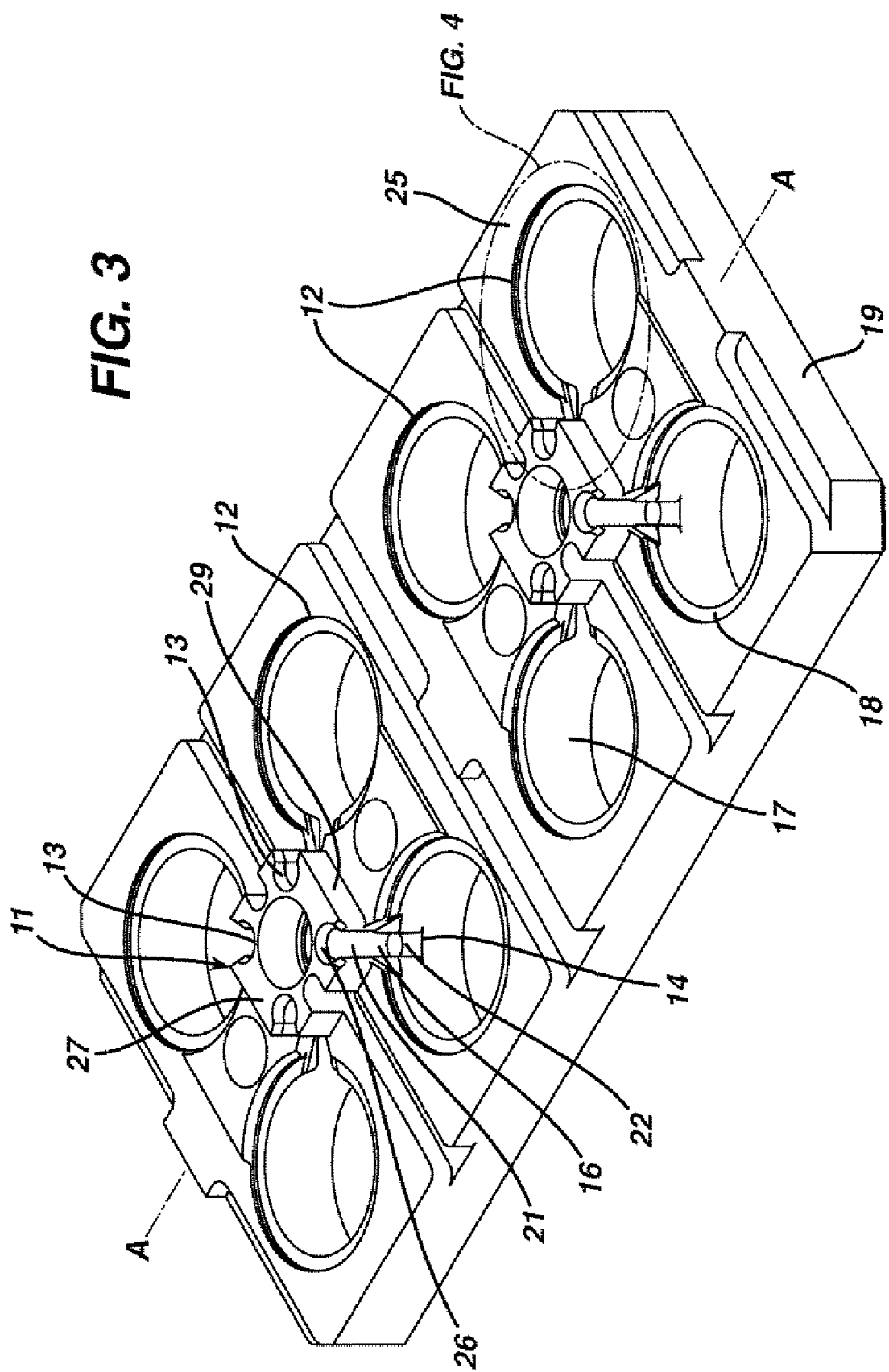
FIG. 3 is a perspective view of one embodiment of a pallet of the invention.

In FIG. 3 is shown a preferred embodiment of an apparatus useful in the method of the invention. Shown in FIG. 3 is rectangular pallet 10 having a base 19, a top 25 and four sidewalls 28 therebetween. Pallet 10 contains a plurality of front curve supports 12 into which the front curve mold halves are placed. Each front curve support 12 is formed of a curved wall 17 and a ledge 18 extending radially therearound and outwardly from the topmost portion of curved wall 17. Curved wall 17 and ledge 18 are sized and shaped so that front curve mold half 102 can be placed into the support 12 with ledge 18 supporting flange 107. Ledge 18 prevents tilting of front curve mold half 102. At one location on curved wall 17 is a front curve pocket 14 sized and shaped to be suitable for receiving front curve tab 108. Front curve pocket 14 is formed of bottom surface 22 and front curve pocket wall 16. Bottom surface 22 extends radially outwardly from curved wall 17 to curved front curve pocket wall 16. When tab 108 is placed into front curve pocket 14, rotation of the front curve mold half is substantially prevented.

Additionally, pallet 10 includes pallet risers 11 contiguous with and arising upwardly from top 25 of pallet 10. Pallet risers 11 are composed of a top surface 27 and sidewalls 29. Each riser has a plurality of tab orientation channels 13 that are formed of a curved wall 21 contiguous with, at its lower end, and extending upwardly from, front curve pocket wall 16. At its uppermost end, curved wall 21 is contiguous with beveled wall 26 which in turn is contiguous with top surface 27 extending radially therefrom. Tab orientation channels 13 may be oriented as desired, but preferably are at 45°, 135°, 225°, and 315° relative to horizontal axis A of top surface 25 of pallet 10. Tab orientation channels 13 are configured to receive projecting tab 114 of the back curve mold half. When back mold half tab 114 is placed into orientation channel 13, the back curve mold half is constrained so that titling and rotation in relation to the front curve mold half are substantially prevented. Thus, once placed within pallet 10, the front curve and back curve mold halves are substantially fixed so that they maintain the desired position relative to each other.

In the pallets of the invention, the channels 13 and pockets 14 limit the movement of the tabs of the mold halves and, thus, of the molds. This can be achieved by maintaining a tight tolerance between the entirety of the pockets 14 and orientation channels 13 relative to the front and back curve mold tabs. Because curved wall 21, front curve pocket wall 16, and the front and back curve mold halves have a width and a height, there are four planes over which to maintain the tolerance. Maintaining a tight tolerance over the four planes is difficult because of the tooling, materials and processes used to make each part. Thus, it is another discovery of the invention that the desired tolerance can be achieved by maintaining the desired tolerance over a line running from a point in each of two vertical planes in the curved walls.

Figure 4:
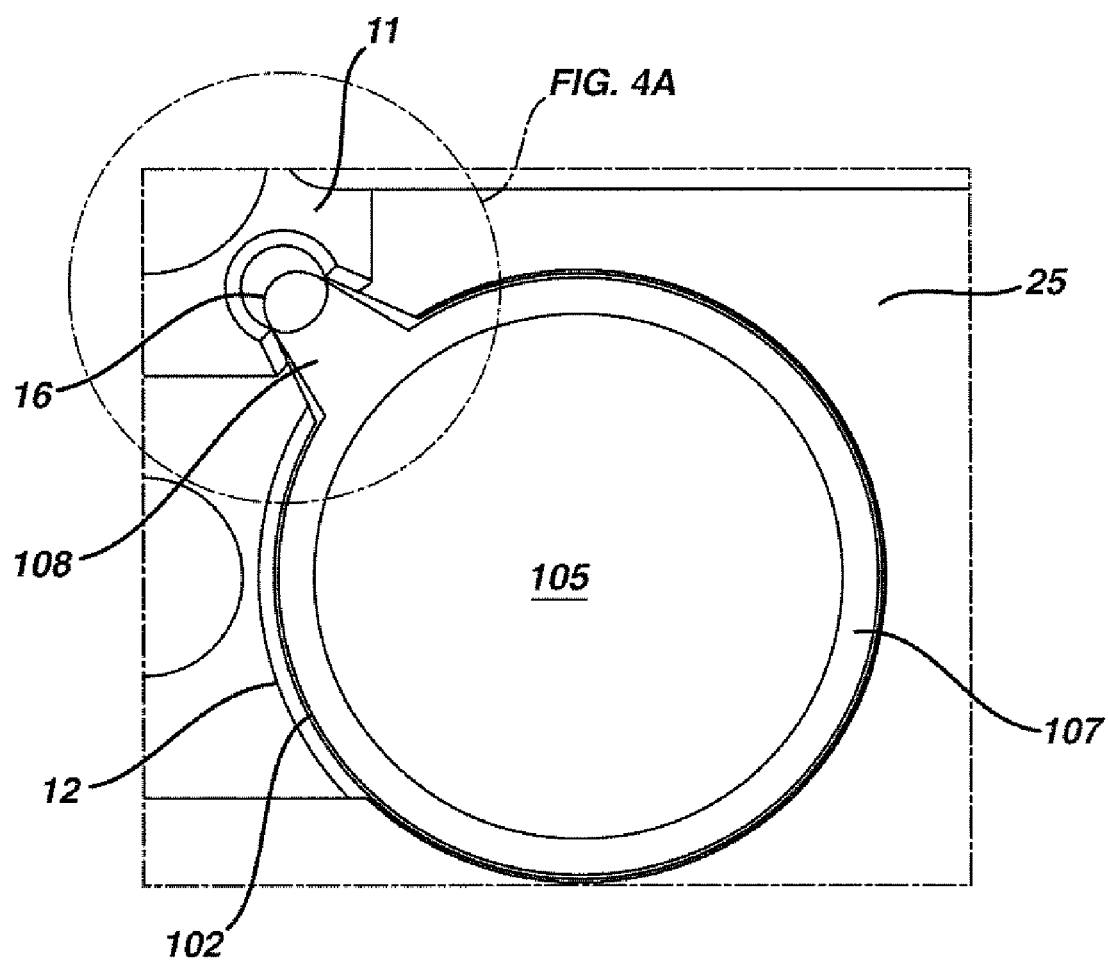
FIG. 4 is a top plan view of a portion of the pallet of FIG. 3 showing front curve mold half within the pallet.
Figure 4A:
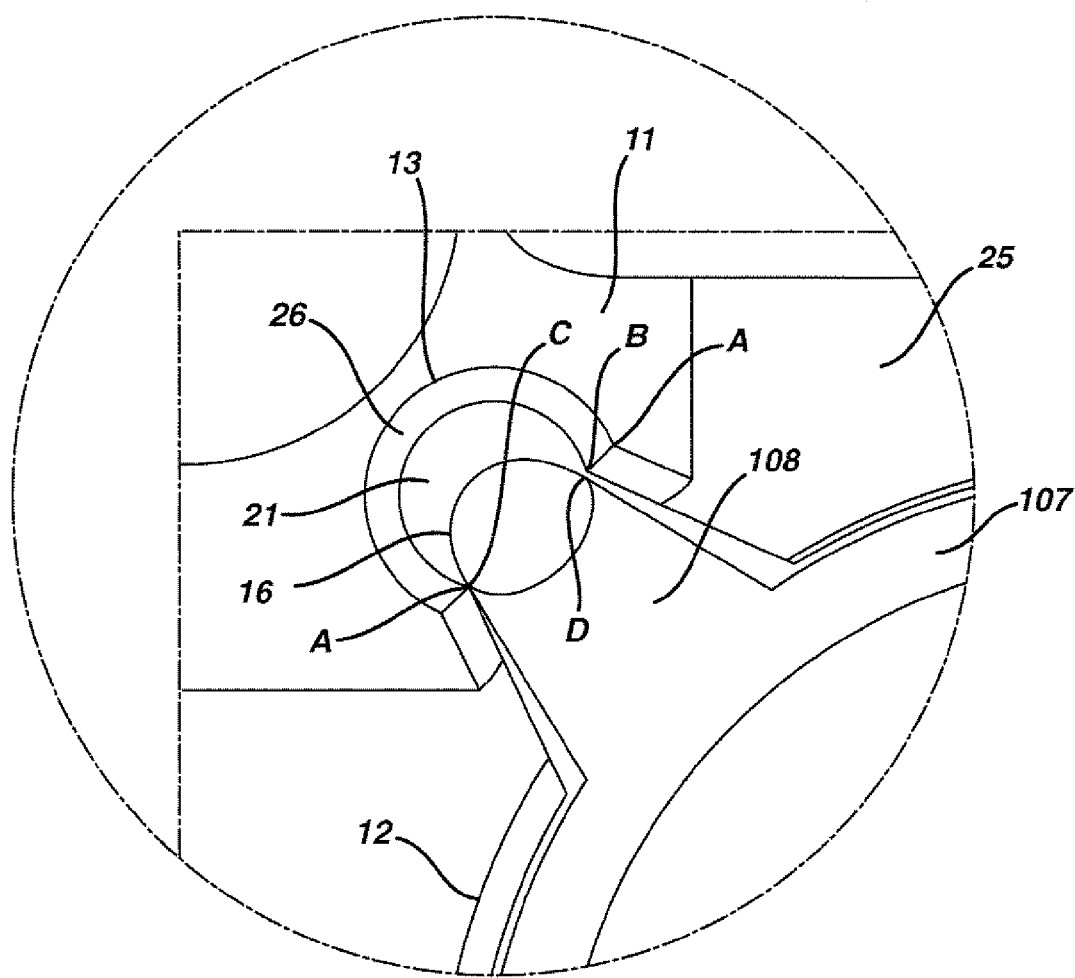
FIG. 4a is a magnified view of a portion of the pallet of FIG. 4.

Referring to FIGS. 4 and 4a, a front curve mold half 102 is shown in a front curve support 12. Points A and B in the orientation channel 13 of riser 11 are the points defining the line running in the vertical plane of channel 13. Tolerance over the line is controlled by specifying the channel to be precise at points A and B. Preferably, the tolerance is such that an angular tolerance of less than about 0.5 degrees is maintained so that rotation and tilting of the back curve mold half and rotation of the front curve mold half are substantially eliminated.

Figure 5:
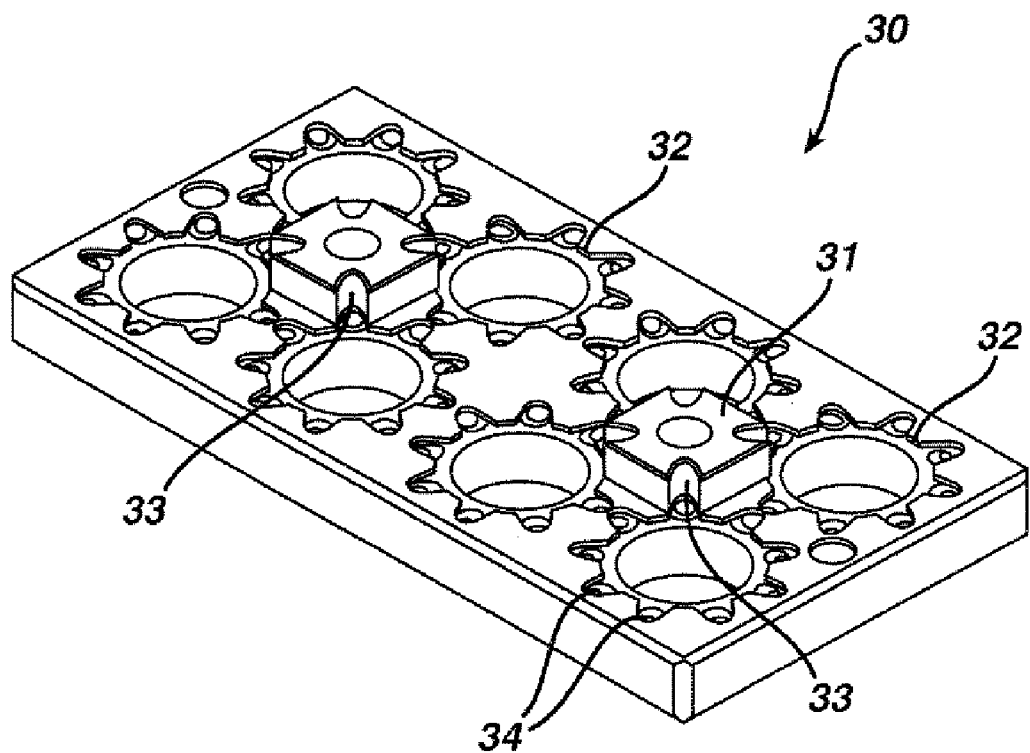
FIG. 5 is a perspective view of a second embodiment of a pallet of the invention.

In FIG. 5 is shown an alternative embodiment of a pallet 30 of the invention. Pallet 30 has a plurality of front curve supports 32 each of which supports has a plurality of tab retention pockets 34. Tab retention pocket 34 is sized and shape so that it is suitable for fixedly receiving a front curve projecting tab 108. Pallet 30 additionally includes pallet risers 31, which risers each have a plurality of back curve projecting tab orientation channels 33 sized and shaped to receive projecting tab 114 of the back curve mold half.

The mold halves useful in the invention conveniently may be made by injection molding the mold halves from mold inserts. Preferably, the molding is carried out so that the mold half will have a tightly controlled tolerance at the points at which the mold half touches points A and B on the pallet riser. For example molding of the front curve mold half preferably is carried out so that, points C and D as shown in FIG. 4a on front curve mold half 102, are of a tolerance suitable to achieve substantial elimination of rotation of the front curve mold half when the mold half is within the front curve pocket.

In a preferred embodiment, the orientation of the front curve mold half insert used in molding is fixed in relationship to the projecting tab is fixed based on best performance at demolding compromised with best performance at injection molding of the mold half In other words, the front curve mold insert is oriented so that the thick and thin portion of the lens will be in the substantially best orientation for demolding. Typically, the best orientation is one in which the thinnest portion of the mold are removed from the stress imposed by demolding. The back curve mold half insert orientation is selected to produce the best performing parameter lens. Thus, the back curve mold half preferably is inserted in the injection molding mold at the desired cylinder axis and small adjustments are made to the insert's position to correct for small shifts in axis, cylinder and sphere parameters that occur during processing. For example, if a lens mold assembly, composed of front and back curve mold halves, is assembled at exactly a forty degree axis, the resulting lens will be several degrees off of the desired forty degree axis due to one or more of monomer shrinkage and toricity induced during injection molding of the mold halves.

What is claimed is:

1. An apparatus for controlling alignment of a first and second mold half in relation to each other comprising:
   a.) a pallet having a base, a top surface, and four sidewalls therebetween;
   b.) a plurality of front curve supports, each support comprising a curved wall and ledge extending radially therearound, wherein the curved wall is of a size and a shape suitable to receive a front curve mold half therein, the ledge is of a size and a shape suitable to support a flange of the mold half, and the support prevents the rotation and tilting of the front curve mold half;
   c.) a plurality of rises arising upwardly from the pallet top surface, each riser comprising a top surface, sidewalls, and a plurality of tab orientation channels sized and shaped for receiving a mold half tab so that tilting and rotation of the mold half is eliminated by the alignment of a portion of the mold half tab with two points within the tab orientation channel for each curve support.

2. The apparatus of claim 1, wherein the front curve pocket is of a size and shape suitable to receive a triangular tab.

3. The apparatus of claim 1, wherein each of the plurality of risers comprises four tab orientation channels.

4. The apparatus of claim 2, wherein each of the plurality of risers comprises four tab orientation channels.

5. The apparatus of claim 3, wherein the four tab orientation channels are located at about 45°, 135°, 225°, and 315° relative to a horizontal axis of the pallet top surface.

6. The apparatus of claim 4, wherein the four tab orientation channels are located at about 45°, 135°, 225°, and 315° relative to a horizontal axis of the pallet top surface.

7. A mold assembly comprising:
- a.) a first and second mold half; and
- b.) an apparatus for controlling alignment of first and second mold halves in relation to each other, the apparatus comprising:
  - (i.) a pallet having a base, a top surface, and four sidewalls therebetween;
  - (ii.) a plurality of front curve supports, each support comprising a curved wall and ledge extending radially therearound, wherein the curved wall is of a size and a shape suitable to receive a front curve mold half therein, the ledge is of a size and a shape suitable to support a flange of the mold half, and the support prevents the rotation and tilting of the front curve mold half;
  - (iii.) a plurality of rises arising upwardly from the pallet top surface, each riser comprising a top surface, sidewalls, and a plurality of tab orientation channels sized and shaped for receiving a mold half tab so that tilting and rotation of the mold half is eliminated by the alignment of a portion of the mold half tab with two points within the tab orientation channel for each curve support.

8. The mold assembly of claim 7, wherein the front curve pocket is of a size and shape suitable to receive a triangular tab.

9. The mold assembly of claim 7, wherein each of the plurality of risers comprises four tab orientation channels.

10. The mold assembly of claim 8, wherein each of the plurality of risers comprises four tab orientation channels.

11. The mold assembly of claim 9, wherein the four tab orientation channels are located at about 45°, 135°, 225°, and 315° relative to a horizontal axis of the pallet top surface.

12. The mold assembly of claim 10, wherein the four tab orientation channels are located at about 45°, 135°, 225°, and 315° relative to a horizontal axis of the pallet top surface.

* * * * *